United States Patent [19]
Suzuki

[11] Patent Number: 5,151,897
[45] Date of Patent: Sep. 29, 1992

[54] INTER-LAN CONNECTION APPARATUS AND INTER-LAN CONNECTION METHOD

[75] Inventor: Hideo Suzuki, Yokohama, Japan

[73] Assignee: Fujitsu Limited, Kawasaki, Japan

[21] Appl. No.: 651,570

[22] Filed: Feb. 6, 1991

[30] Foreign Application Priority Data

Mar. 20, 1990 [JP] Japan .................. 2-071118

[51] Int. Cl.⁵ .............................................. H04J 3/08
[52] U.S. Cl. ............................... 370/85.13; 370/85.14
[58] Field of Search .......................... 370/85.13, 85.14

[56] References Cited

U.S. PATENT DOCUMENTS

| | | | |
|---|---|---|---|
| Re. 33,426 | 11/1990 | Sugimoto et al. | 370/85.13 |
| 4,597,078 | 6/1986 | Kempf | 370/85.13 |
| 4,627,052 | 12/1986 | Hoare et al. | 370/85.13 |
| 4,715,030 | 12/1987 | Koch et al. | 370/85.13 |
| 4,737,953 | 4/1988 | Koch et al. | 370/94.1 |
| 4,933,937 | 6/1990 | Konishi | 370/85.13 |

Primary Examiner—Doouglas W. Olms
Assistant Examiner—Russell W. Blum
Attorney, Agent, or Firm—Staas & Halsey

[57] ABSTRACT

An inter-LAN connection apparatus and a method for increasing the speed of communication and to expand the network. The inter-LAN connection apparatus has a plurality of ports corresponding to a plurality of LANs, respectively, and a common unit that is commonly connected to the ports. Each of the ports receives a frame supplied from the corresponding LAN, aborts the frame when the destination picked up from the received frame exists in the LAN that is the source of transmission, transfers the frame to the common unit when the destination exists in the LAN different from the LAN that is the source of transmission, and sends the frame transferred from the common unit to the LAN via a corresponding port.

20 Claims, 14 Drawing Sheets

INTER-LAN CONNECTION APPARATUS AND INTER-LAN CONNECTION METHOD

BACKGROUND OF THE INVENTION (1) Field of the Invention

The present invention relates to an inter-LAN connection apparatus called a MAC (medium access control) bridge which transfers frames among local area networks (LANs), and to an inter-LAN connection method. More particularly, the invention relates to a filtering control system in the MAC bridge.

A LAN (local area network) is a communication network for connecting computers, terminals, and peripheral equipment that are installed in relatively limited places such as institutes and factories. Depending upon the topology, the LANs can be classified into those of the bus type such as token buses, and those of the ring type such as token rings. The medium access method includes a carrier sense multiple access with collision detection (CSMA/CD) and token passing.

When the above various types of LANs are connected, frames are to be transferred among the LANs. A plurality of LANs are often connected to one LAN.

In the inter-LAN connection apparatus, when the destination of a received frame is a station in the LAN which is a source of transmission, it is desired to abort the frame. If it is not aborted, the load on other LANs that have no relation to that communication, will be increased.

(2) Description of Related Art

In a conventional art, when a plurality of LANs are to be connected to one LAN, a single inter-LAN connection apparatus is connected between the above one LAN and the plurality of LANs.

In the above-mentioned conventional system, however, a microprocessor in the inter-LAN connection apparatus retrieves address tables for all of the frames sent from the LANs what confirm to what LAN to which the destination station is connected, and judges the frames to be either aborted or transferred. Therefore, as the number of LANs that are connected increases, or the number of stations increases in the LANs, or as the communication speed increases, the load increases for the retrieval of the destination and for judging that the frames be aborted or transferred based upon the result of the retrieval, requiring to the microprocessor to have an increased processing ability in the inter-LAN connection apparatus.

In recent years, in particular, speed has tended to be increased along with the development of optical communication technology or encoding technology, and merely increasing the processing speed of a microprocessor is no longer adequate to cope with these problems, but simply causes a drastic increase in the cost of the apparatus. It has therefore been desired to provide an inter-LAN connection apparatus that is capable of easily coping with an increase in the speed of communication and the expansion of a network.

Described below in detail are the problems in a conventional inter-LAN connection apparatus. As described above, the inter-LAN connection apparatus (MAC bridge) works to transfer frames among a plurality of LANs. The communication frames in the same LAN, however, must be blocked (filtered) from being transferred and must be aborted. In general, the transferring or aborting operation is processed by referring to the station addresses registered in a filtering table and to the port numbers of the LAN to which the station is connected.

The relay function for the transfer or abortion has heretofore been realized by using a common unit of the inter-LAN connection apparatus (MAC bridge). That is, all the frames flowing from the LANs are received by a common buffer in the inter-LAN connection apparatus and are examined whether to be transferred or aborted. This processing ability is usually called a filtering rate. The LANs in recent years have been designed to operate at ever faster speeds, and it has been demanded to increase the filtering rate.

When frames are relayed by the inter-LAN connection apparatus (MAC bridge), in general, the transmitting speed is not always greater than the receiving speed since there are differences or variations in the speed and load of a LAN. In general, it often happens that a number of frames greater than the transmitting speed must be relayed, and a buffer having a sufficient capacity must be provided. According to the prior art in which the frames of all LANs connected to the inter-LAN connection apparatus are all received by the buffer and filtered, however, an additional processing must be carried out to effectively utilize the regions of the aborted frames, causing the filter processing and the relay processing ability to be decreased. Furthermore, the firmware processing imposes a limitation on the filter processing and on the relay processing ability.

SUMMARY OF THE INVENTION

The object of the present invention is to provide an inter-LAN connection apparatus which is capable of easily coping with an increase in the speed of communication and an expansion of the network, as well as inter-LAN connection method.

Another object of the present invention is to provide a filtering control system which is capable of offering a sufficiently high filtering rate and is capable of increasing the relay processing ability.

In order to achieve the above-mentioned object, the present invention provides an inter-LAN connection apparatus having a plurality of ports which correspond to a plurality of LANs, respectively, to transmit and receive the frames to and from the LANs, and a common unit that is commonly connected to the plurality of ports to transfer the frames among the LANs. Here, each of the plurality of ports comprises frame receiving means that receives a frame supplied from a corresponding LAN; first transfer means which is actively connected to the frame receiving means to abort the frame when the destination picked up from the received frame exists in the LAN which is the source of transmission, and to the first transfer means, instructs the frame receiving means to abort the frame when the destination picked up from the received frame exists in the LAN which is the source of transmission, and instructs the first transfer means to transfer the frame when the destination exists in a LAN different from the LAN that is the source of transmission; and frame transmitting means which sends the frame transferred from the common unit to a corresponding LAN, the common unit comprising frame storage means for storing a frame transferred by the first transfer means, transfer destination determining means for determining the frame transfer destination based on a destination address added to the frame that is stored in the frame storage means, and the second transfer means that transfers the frame stored in the frame storage means to the port of transfer destination determined by the transfer destination determining means.

The transfer destination determining means in the common unit comprises another address table; means for registering in the address table an address of the station which is the source of transmission included in the received frame that is stored in the frame storage means, and an identification number of the LAN to which the station that is the source of transmission pertains; means that compares the destination station address of the received frame with the station address registered in the address table; means which, when the addresses are in agreement with each other as a result of the above comparison, determines whether the identification number of the destination LAN is the same as the identification number of the LAN which is the source of transmission; means that aborts the received frame when the numbers are the same as a result of said determination; means that transfers the received frame to the corresponding port when the numbers are not the same as a result of the above determination; and means that transfers the received frame to all ports when the addresses are not in agreement as a result of the above comparison.

The frame receiving means included in each of the ports comprises a LAN access circuit connected to the corresponding LAN and a received frame storage unit connected to the output of the LAN access circuit. The inter-LAN communication determining means is realized by a filtering control circuit connected between the output of the LAN access circuit and the input of the received frame storage unit. The filtering control circuit is driven while the frame is being written into the received frame storage unit from the LAN access circuit. When it is determined by the filtering control circuit that the frame should be filtered, an abort instruction is sent to the received frame storage unit before the completion of writing of the frame into the received frame storage unit, thereby aborting the frame.

In order to achieve the above object, the present invention provides an inter-LAN connection method, wherein each of the plurality of ports comprises the steps of aborting the received frame when the destination picked up from the frame received from the corresponding LAN exists in the LAN that is the source of transmission, and transferring the received frame to the common unit when the above destination exists in a LAN different from the LAN that is the source of transmission, the common unit comprising the steps of determining the frame transfer destination based upon a destination address added to the frame transferred from the above port, and transferring the frame to the transfer destination port that is determined, and the port sends the frame transferred from the common unit to the corresponding LAN.

BRIEF DESCRIPTION OF THE DRAWINGS

The above objects and features of the present invention will become apparent from the following description of preferred embodiments made in conjunction with the accompanying drawings wherein.

DESCRIPTION OF THE PREFERRED EMBODIMENTS

For better comprehension of the present invention, a conventional inter-LAN connection apparatus and the associated problems will be described first with reference to FIGS. 1 to 6, prior to describing the embodiments of the present invention.

Figure 1:
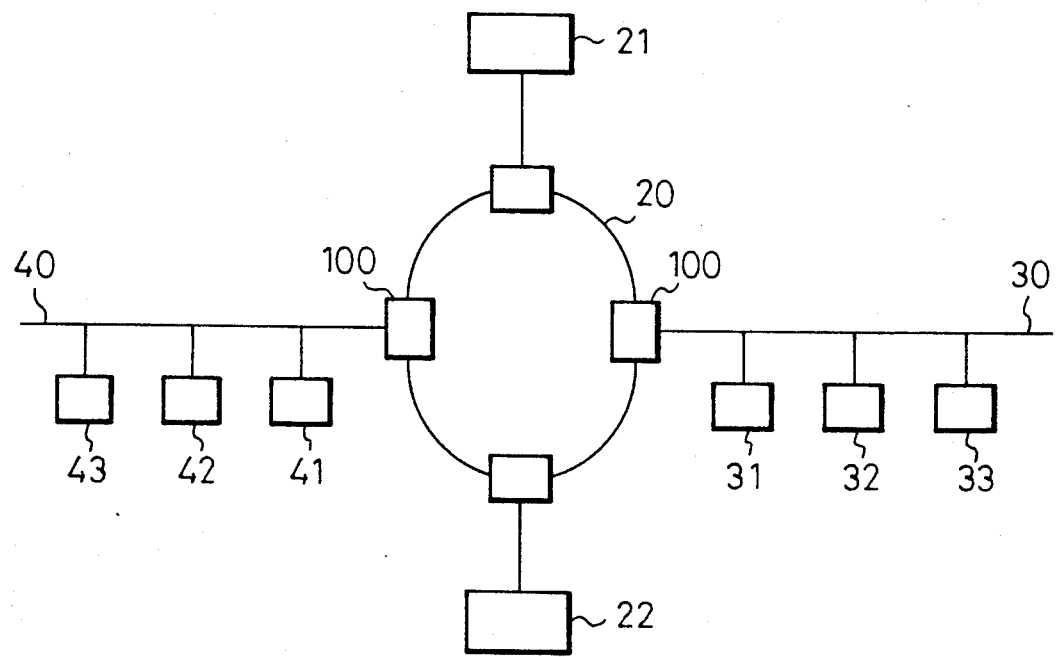
FIG. 1 is a diagram showing a network having a plurality of LANs for explaining the background of the present invention.

FIG. 1 is a diagram illustrating an ordinary network having a plurality of LANs, and wherein reference numerals 20, 30, and 40 denote LANs, 21 and 22 denote computers, 31 to 33 denote stations, 41 to 43 denote stations, and reference numeral 100 denotes inter-LAN connection apparatuses (MAC bridges).

The diagrammed network has three LANs 20, 30, and 40. For instance, the LAN 20 is a fiber distributed data interface (FDDI) system as specified by the American National Standard Institute (ANSI), the LAN 40 is a token-bus system as specified by IEEE 802.4, and the LAN 30 is a CSMA/CD system as specified by IEEE 802.3. Stations 21 and 22 are connected to the LAN 20, the LAN 30 is connected to the LAN 20 via MAC bridge 100, and the LAN 40 is connected to the LAN 20 via MAC bridge 100. Here, MAC stands for medium access control.

Figure 2:
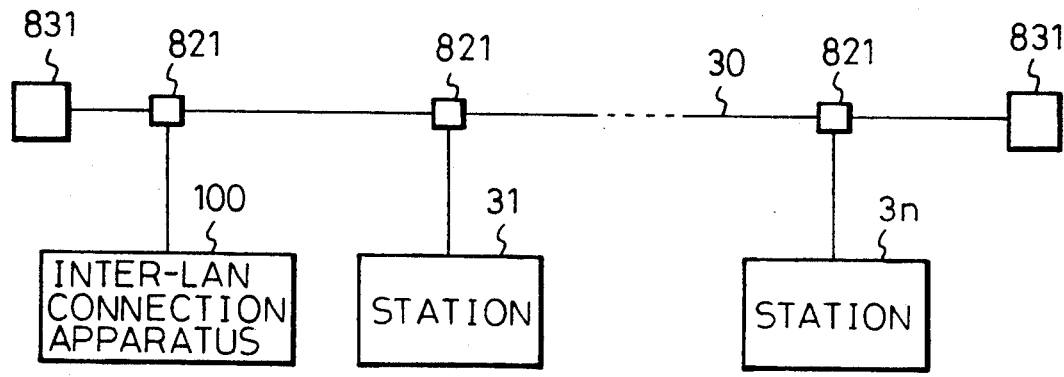
FIG. 2 is a diagram showing the constitution of a bus-type LAN of FIG. 1.

. FIG. 2 is a block diagram which shows in detail the LAN of the CSMA/CD system that is shown in FIG. 1.

In FIG. 2, reference numerals 31 to 3n denote stations, 821 denotes branch units, 831 denotes terminal units, and 100 denotes an inter-LAN connection apparatus. A frame sent from any station such as the station 31 is further sent onto the bus via branch unit 821, and extinguishes at the terminal unit 831. The frame is further sent to another station such as the station 3n via another branch unit 821, and is received by a destination station. The frame is further transferred to a station (not shown in FIG. 2) in the other LAN via the inter-LAN connection apparatus 100.

Figure 3:
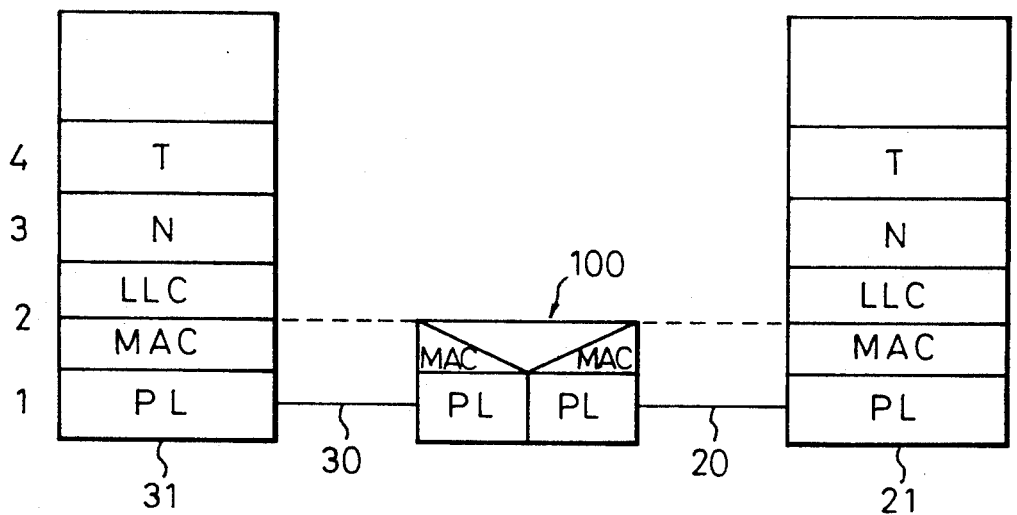
FIG. 3 is a diagram for explaining the function of an inter-LAN connection apparatus (MAC bridge)

FIG. 3 is a diagram for explaining the function of the inter-LAN connection apparatus (MAC bridge), wherein a station 31 on the LAN 30 and a station 21 on the LAN 20 are connected together via the inter-LAN connection apparatus 100. In each station, the communication protocol has a hierarchical structure. The first layer is a physical layer PL, the second layer consists of a MAC layer and a logic link layer LLC, the third layer is a network layer N, and the fourth layer is a transport layer T. When a frame is to be sent from a given LAN to a LAN that has different physical layer and MAC layer, the MAC bridge 100 converts the MAC level for the frame and for the access method and transmits the data having levels greater than the LLC level directly to the other side.

Figure 4:
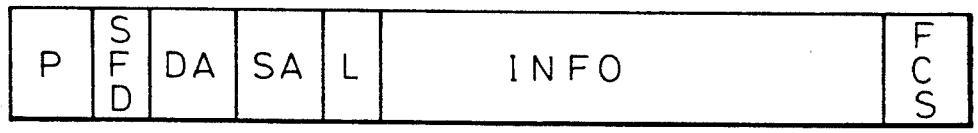
FIG. 4 is a diagram of a frame format on a LAN of the CSMA/CD type.

FIG. 4 shows a frame format of the MAC level used in the bus-type LAN 30 of FIG. 2. The CSMA/CD system is shown as a representative frame structure.

In FIG. 4, symbol "P" denotes a preamble which picks up the clock signal and establishes the synchronism.

Symbol "SFD" denotes a frame start delimiter which indicates the head of an effective frame.

Symbol "DA" denotes a destination address which is an address of a station to where the frame is to be sent.

Symbol "SA" denotes an address of the source of transmission, i.e., denotes an address of a station from where the frame is sent out.

Symbol "L" denotes the data length of an information unit (INFO) in which are inserted the data that are to be communicated.

Symbol "FCS" denotes a frame check sequence which is used for detecting an error in the frame data.

Figure 5:
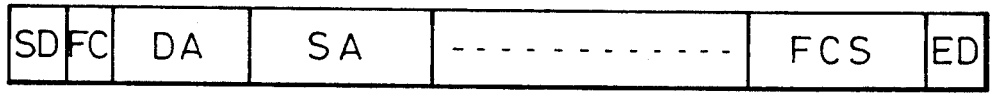
FIG. 5 is a diagram of a frame format on a LAN of the ring type.

The frame that is prepared and sent by any station in the LAN 30 is then received by a station in the same LAN indicated by the same destination address DA. FIG. 5 shows a frame constitution of the MAC level used in the ring-type LAN 20.

In FIG. 5, symbol SD denotes a start delimiter, DA denotes a destination address, SA denotes an address of the source of transmission, FCS denotes a frame check sequence, and ED denotes an end delimiter.

The start delimiter SD and the end delimiter ED have constitutions that differ for every MAC. The destination address DA has a length of two or six bytes. The address SA of the source of transmission, too, has the same length. The destination address DA and the address SA of the source of transmission in the frame are directly sent to the LAN of the other side without being affected by the MAC bridge.

Here, as shown in FIG. 1, when a plurality of LANs are separately constituted and are coupled together via an inter-LAN connection apparatus (bridge apparatus), the frames can be transferred and received separately since the LANs have been constituted separately making it possible to easily expand the network to include a plurality of LANs maintaining a high transmission line utilization efficiency.

Figure 6:
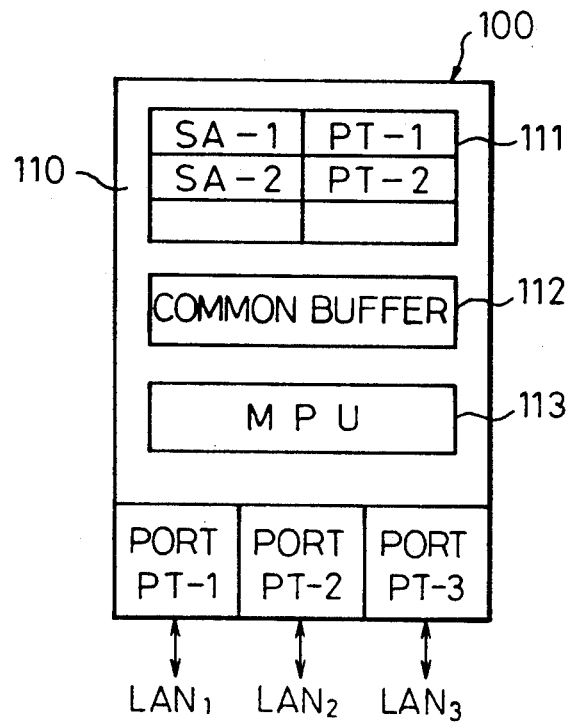
FIG. 6 is a block diagram showing the constitution of a conventional inter-LAN connection apparatus (MAC bridge)

FIG. 6 is a diagram explaining the constitution of a conventional inter-LAN connection apparatus (MAC bridge), and wherein reference numeral 100 denotes a MAC bridge, 110 denotes a common unit, 111 denotes a filtering table, 112 denotes a common buffer, 113 denotes a microprocessor (MPU), and PT-1 to PT-n denote ports.

The MAC bridge 100 is constituted by the common unit 110 and a plurality of ports PT-1 to PT-3. The common unit 110 includes the filtering table 111, common buffer 112, and microprocessor 113. The port PT-1 holds $LAN_1$, the port PT-2 holds $LAN_2$, and the port PT-3 holds $LAN_3$. For instance, a frame sent from the $LAN_1$ is stored in the common buffer 112 in the common unit 110 via port PT-1 under the control of microprocessor 113, and is retrieved with reference to the filtering table 111 in regard to which port it should be sent, and is sent to the port that is determined as a result of retrieval.

The writing of data into the filtering table 111 is described below. First, nothing has been written on the filtering table 111. As a frame is sent from the $LAN_1$, the address SA-1 of the source of transmission and the port number PT-1 in the frame are written into the filtering table 111. The frame is sent to the $LAN_2$ via port PT-2 and is further sent to the $LAN_3$ via port PT-3. If it is presumed that a response frame is sent from the $LAN_2$, the address SA-2 of the source of transmission and the port number PT-2 in the response frame are written into the filtering table 111. The same procedure is repeated hereafter.

As described above, the filtering table 111 is retrieved every time a frame is arrived to determine to which port the frame should be sent, and the frame is sent to the port that is determined. Here, however, when it is determined that the station of the destination address and the station of the source address of transmission are connected to the same LAN, there is no need to transfer the frame to other LANs and this frame is aborted.

As described above, the station of each LAN is allowed to transmit and receive frames to and from other stations in the same LAN, as well as to transmit and receive frames to and from other stations connected to other LANs via the inter-LAN connection apparatus (MAC bridge) 100.

In the above-mentioned conventional system, the microprocessor 113 in the inter-LAN connection apparatus 100 retrieves the address table 111 for all frames sent from all LANs to recognize the LAN to which a destination station is connected, and sends an instruction in regard to whether the frame is to be aborted or transferred. Therefore, an increase in the number of LANs that are connected and the number of stations in the LANs or an increase in the communication speed results in an increase in the burden for instructing that the frames be aborted or transferred based on the retrieval of destinations and the results of retrieval, making it necessary to employ the microprocessor 113 having an increased processing ability.

In recent years, in particular, communication speed is ever increasing along with developments in the optical communication technology and encoding technology, and employment of a microprocessor having an increased processing ability is no longer adequate to cope with that situation but simply causes the cost of the apparatus to increase remarkably. Therefore, it has been demanded to provide an inter-LAN connection apparatus that is capable of easily coping with an increase in the communication speed and expansion of the network.

Problems inherent in the conventional inter-LAN connection apparatus will be further described below.

As described above, the inter-LAN connection apparatus relays frames among a plurality of LANs, but a communication frame in the same LAN must be blocked (filtered) from being relayed. In general, this function is processed by a station address registered to the address table 111 and by a port number of the LAN to which the station is connected.

So far, the relay function has been provided in the common unit of the inter-LAN connection apparatus, and the frames flowing in all LANs are all received by the common buffer and are filtered. In general, this filtering ability is called filtering rate. In recent years, LANs have been designed to operate at faster speeds than ever before, and it has been become necessary to increase the filtering rate.

When a frame is to be relayed by an inter-LAN connection apparatus, in general, the transmitting speed is not always greater than the receiving speed due to difference or variety in the speed and load of the LANs. Generally, it often happens that the frames must be relayed in a number greater than the transmitting speed, and a sufficiently large buffer must be provided. When all of the frames on the LANs held by the inter-LAN connection apparatus are received by the buffer and are filtered in a customary manner, however, the filter processing and the relay processing ability are deteriorated due to the additional processing required to effectively use the regions of the frames that are aborted. Furthermore, the filter processing and the relay processing carried out by the firmware using a microprocessor impose limitations on the filter processing and relay processing ability.

The object of the present invention is to provide an inter-LAN connection apparatus that is capable of easily coping with an increase in communication speed and expansion in a network.

Another object of the present invention is to provide a filtering control system which maintains a sufficiently high filtering rate and which helps increase the relay processing ability.

Figure 7:
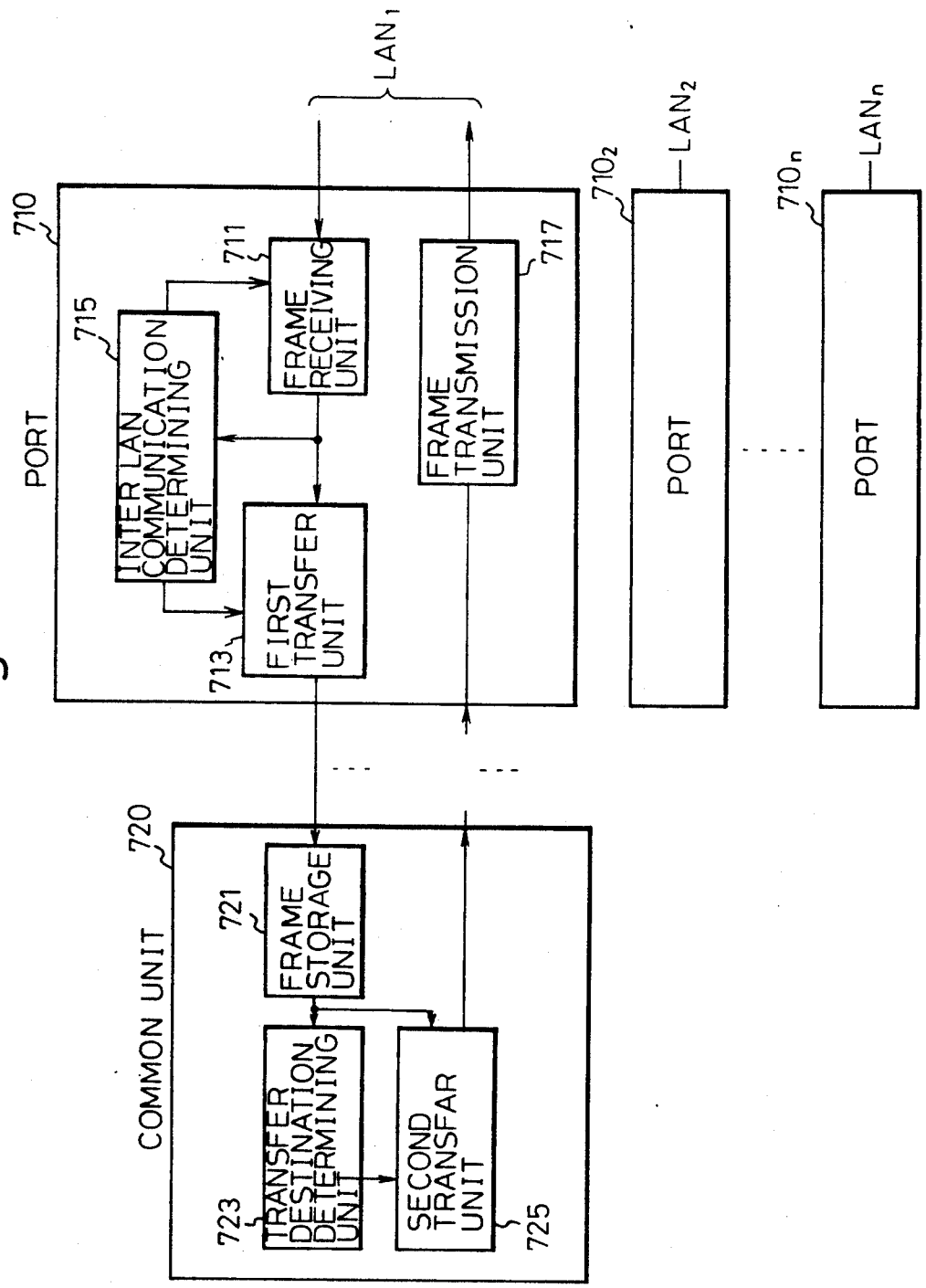
FIG. 7 is a block diagram which schematically shows the constitution of an inter-LAN connection apparatus (MAC bridge) according to an embodiment of the present invention.

FIG. 7 is a block diagram which schematically illustrates the inter-LAN connection apparatus according to an embodiment of the present invention.

In FIG. 7, the inter-LAN connection apparatus of the present invention has a plurality of ports 710 to 710n that correspond to a plurality of LANs LAN$_1$ to LANn and that transmit and receive the frames to and from these LANs, and a common unit 720 that is commonly connected to these plurality of ports to transfer the frames among the LANs.

The ports 710$_1$ to 710n are each comprised of a frame receiving unit 711 that receives the frame fed from a corresponding LAN, a first transfer unit 713 that transfers the received frame to the common unit 720, an inter-LAN communication determining unit 715 that instructs the frame receiving unit 711 to abort the frame when the destination picked up from the received frame exists in the LAN which is the source of transmission, and instructs the first transfer unit 713 to transfer the frame when the destination exists in a LAN which is different from the LAN that is the source of transmission, and a frame transmitting unit 717 which sends the frame transferred from the common unit 720 to a corresponding LAN.

The common unit 720 comprises a frame storage unit 721 for storing a frame transferred by the first transfer unit 713, a transfer destination determining unit 723 for determining the frame transfer destination based on a destination address added to the frame that is stored in the frame storage unit 721 to the port of transfer destination determined by the transfer destination determining unit 723.

As a whole, therefore, the frames in the communication between the LANs are processed by the common unit 720.

The operation of the apparatus of FIG. 7 is described below.

As the frame is received from the LAN$_1$ by the frame receiving unit 711 in the port 710, the inter-LAN communication determining unit 715 picks up the destination of the frame. When the destination that is picked up indicates that the frame is for communication in the LAN$_1$, the frame received by the frame receiving unit 711 is aborted. When it is not determined that the frame is to be aborted (address is not often registered in the table, and the communication frame only among the LANs is not necessarily handed over to the common unit), the frame is transferred to the common unit 720 by the first transfer unit 713.

In the common unit 720, the frames transferred from the ports 710$_1$ to 710n are stored in the frame storage unit 721, and the destination of the frame is determined by the transfer destination determining unit 723. Then, the frame is transferred by the second transfer unit 725 to the port of the determined transfer destination, e.g., to the port 710$_2$ which then sends the frame to the LAN$_2$ through the frame transfer unit (equivalent to 713 in 710$_1$).

According to the present invention, the frame is aborted when the LAN which is the source of transmission is the same as the LAN that is the destination, and the frame is transferred between the LANs, i.e., transferred to the common unit 720 when the LAN that is the source of transmission is different from the LAN is the destination.

The common unit 720 processes the frames of communication between the LANs transferred through the port.

An embodiment of the present invention will now be described in further detail.

Figure 8:
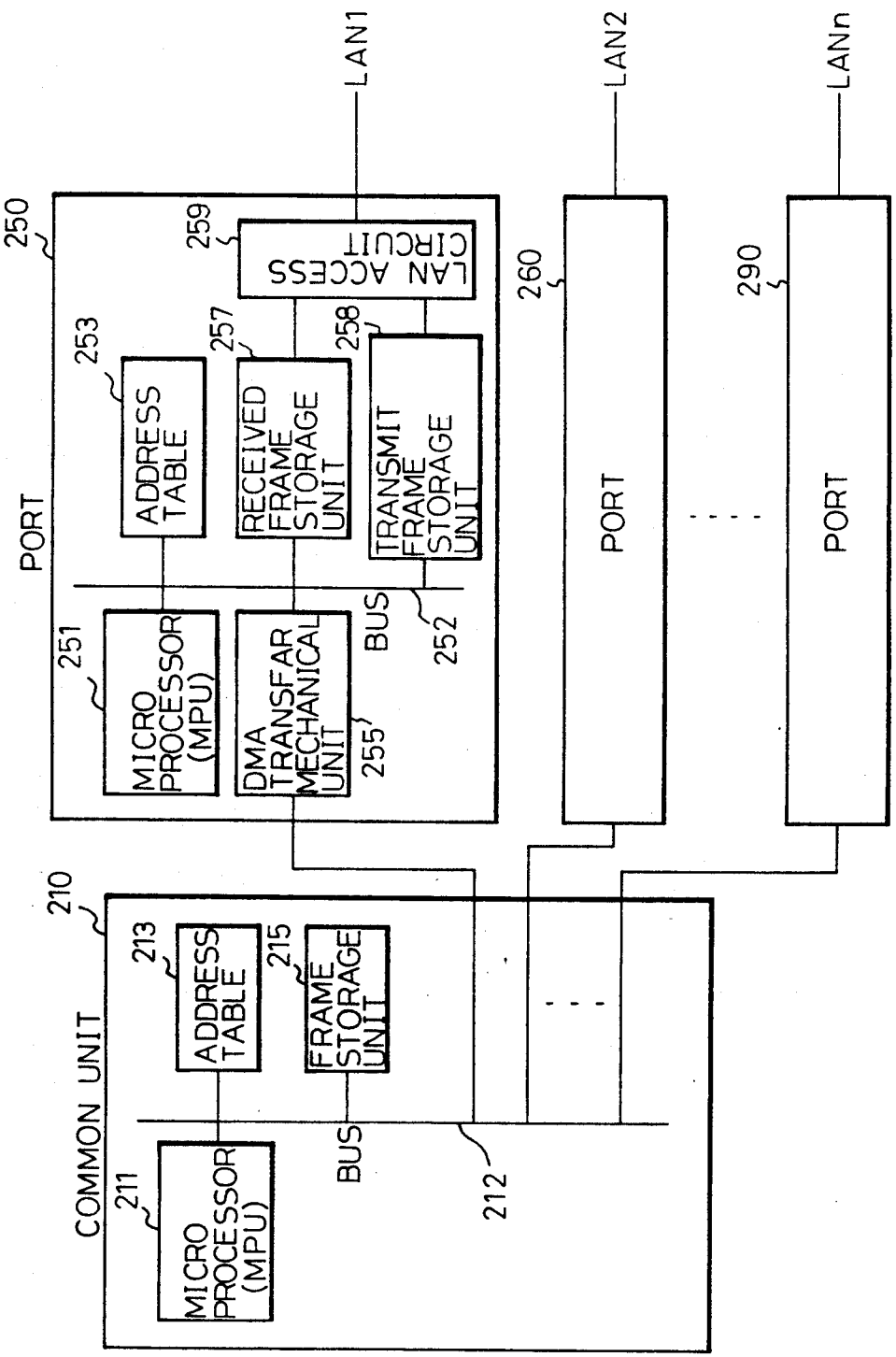
FIG. 8 is a block diagram which shows in further detail the constitution of FIG. 7.

FIG. 8 is a block diagram which illustrates in detail the constitution of FIG. 7.

I. Relationships between FIG. 7 and FIG. 8

The relationships between FIG. 7 and FIG. 8 are described below.

The ports 710, 710$_2$, ---, 710n correspond to the ports 250, 260, ---, 290.

The frame receiving unit 711 corresponds to a received frame storage unit 257 and a LAN access circuit 259.

The first transfer unit 713 corresponds to a direct memory access (DMA) transfer unit 255.

The inter-LAN communication determining unit 715 corresponds to a microprocessor 251 and an address table 253.

The frame transmission unit 717 corresponds to a transmitted frame storage unit 258 and a LAN access circuit 259.

The common unit 720 corresponds to a common unit 210.

The frame storage unit 721 corresponds to a frame storage unit 215.

The transfer destination determining unit 723 corresponds to a microprocessor 211 and an address table 213.

The second transfer unit 725 corresponds to the microprocessor 211 and a DMA transfer unit 255.

II. Constitution of the Embodiment shown in FIG. 8

Referring to FIG. 8, the inter-LAN connection apparatus according to the embodiment of the present invention corresponds in a one-to-one manner to any one of a plurality of LANs, and is equipped with a plurality of ports 250, 260, ---, 290 for transferring and receiving the frames to and from the LANs, and with the common unit 210 that is connected to these ports to transfer the frames among the LANs.

The port 250 is equipped with the microprocessor (MPU) 251 that controls the whole port 250, address table 253 that stores the address data of a station (not shown) connected to the corresponding $LAN_1$, DMA transfer unit 255 which carries out direct memory access (DMA) control of the frames relative to the common unit 210, received frame storage unit 257 that initially holds the frame received from the corresponding $LAN_1$, transmit frame storage unit 258 that initially holds the frame to be sent to the corresponding $LAN_1$, and LAN access circuit 259 that controls the transmit and reception of frame to and from the corresponding LAN transmission line.

The microprocessor 251, address table 253, DMA transfer unit 255, received frame storage unit 257, and transmit frame storage unit 258 are connected to a bus 252. Further, the received frame storage unit 257 and transmit frame storage unit 258 are connected to the LAN access circuit 259. The DMA transfer mechanical unit 255 is connected to a bus 212 in the common unit 210.

Other ports 260 to 290 are constituted in the same manner as the port 250, and are not described here in detail.

The common unit 210 comprises the microprocessor 211 that controls the entire common unit 210, address table 213 that stores address information related to stations connected to all LANs, and frame storage unit 215 that initially stores the frames transferred between the LANs.

The microprocessor 211, address table 213 and frame storage unit 215 are connected to the bus which is connected to the DMA transfer unit 255 in each port.

Figure 9:
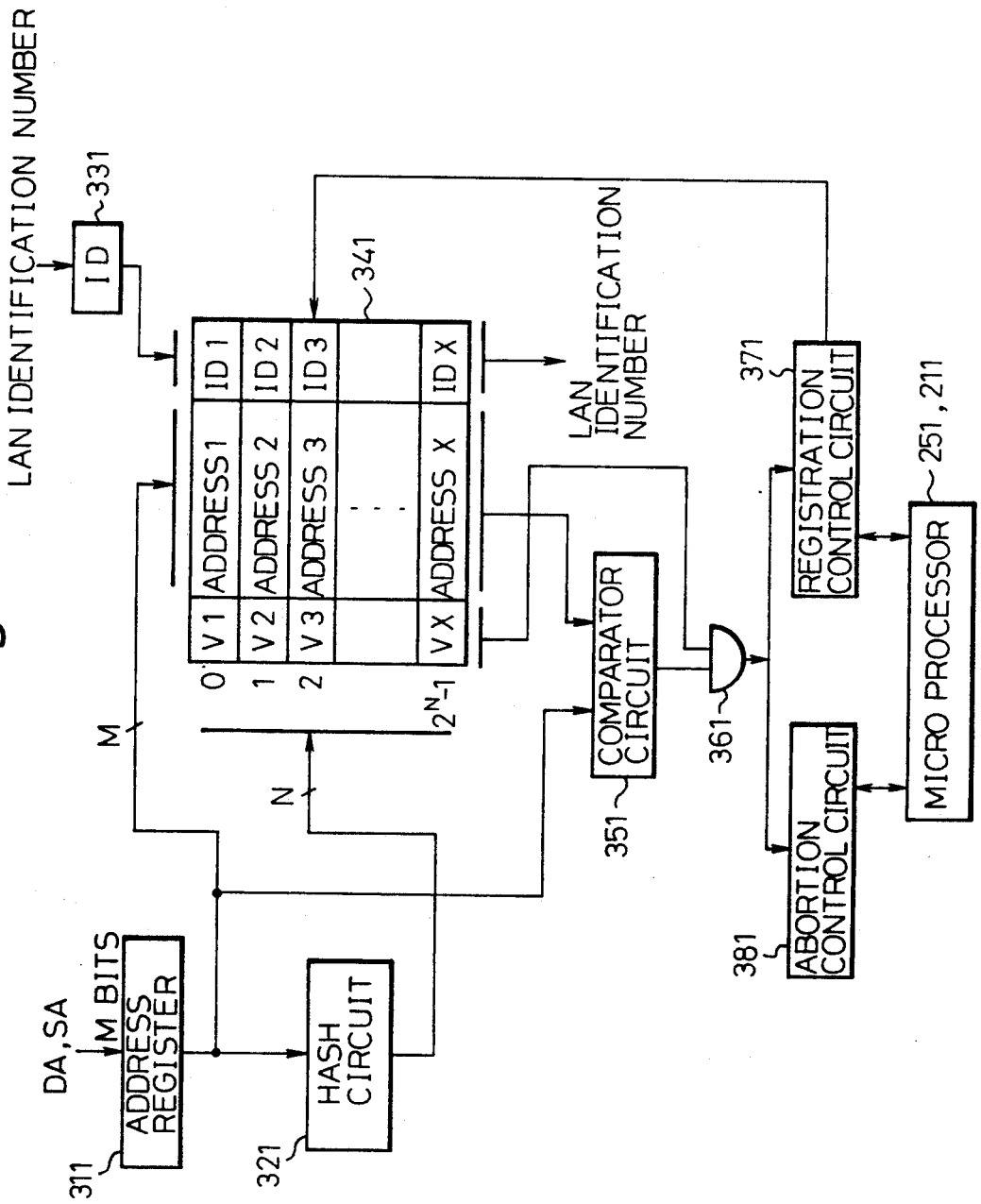
FIG. 9 is a diagram showing the constitution of an address table of FIG. 8.

FIG. 9 shows in detail the constitution of address tables 213 and 253 shown in FIG. 8.

As shown in FIG. 9, each address table is constituted by an address register 311, a hash circuit 321 for reducing the required memory capacity of the table, an ID register 331, a table 341, a comparator circuit 351, an AND gate 361, a registration control circuit 371, and an abortion control circuit 381.

The ID register 331 is necessary only for the address table 213 in the common unit 220, and is not provided for the address table 253 in the ports. This is because, each port receives the frame from only the corresponding LAN. Therefore, LAN identification numbers IDI to IDX are not stored in the address tables in the ports.

The address register 311 stores a station address (destination address DA or source address SA of the receiving site) picked up from the frame. A station address consisting of M bits stored in the address register 311 is input to the hash circuit 321 where it is compressed into a table address consisting of N bits ($N < M$).

The output of the address register 311 may be used directly as an address for the table 341 using the hash circuit 321.

The table 341 stores sets of a valid bit V which indicates that the stored data are effective, a station address consisting of M bits, and an ID which is a LAN identification number, and the position of storage is specified by a table address consisting of N bits output from the hash circuit 321.

The ID register 331 initially stores the LAN identification number that identifies the LAN which transmits and receives the frame in the common unit 210.

The comparator circuit 351 compares the address of the station which is a source of transmission or is a destination stored in the address register 311 with the address of the station read out from the table 341, and outputs a signal of logic level "1" when they are in agreement with each other.

The AND gate 361 calculates a logical product of an output from the comparator circuit 351 and a valid bit V read out from the table 341. When the address of the station which is the source of transmission is compared with the address of the station read out from the table 341, the output of the AND gate 361 is received by the registration control circuit 371, and when the address of the destination station is compared with the contents of the table 341, the output of the AND gate 361 is received by the abortion control circuit 381. The registration control circuit 371 and the abortion control circuit 381 are controlled by a corresponding microprocessor 211 in the case of the common unit 210).

III. Operation of the embodiment shown in FIGS. 8 and 9

Operation of the aforementioned embodiment of the present invention will now be described.

(i) Operation of the port

First, the case when a port 250 receives a frame is described below with reference to a flow chart of FIG. 10.

As the LAN access circuit 259 receives the frames on the LAN transmission line (step 411), the frames that are received are successively stored in the receiving frame storage unit 257. When the received frames are all stored, the microprocessor 251 is informed of the reception of the frames (step 412).

Then, the microprocessor 251 determines whether the address of the station which is the source of transmission included in the received frame has been registered in the address table 253 or not (step 413). When it has not been registered (negative determination), the address is registered in the address table 253 (step 414).

When the affirmative determination is made (when it has been registered) at the step 413 or when the registration is finished at the step 414, the microprocessor 251 then determines whether the received frame is the one being communicated between the LANs (step 415). Whether the frame is the one being communicated between the LANs is determined by determining whether the address of the station indicated by the destination address DA of the received frame is in agreement with any one of the station addresses that have been registered in the address table 253.

In the case of affirmative determination, i.e., when they are not in agreement, the frame is determined to be the one being communicated within the LAN, and the received frame is aborted by the abortion control circuit 381 (step 416), and the operation of the port 250 for the received frame is finished.

In the case of the negative determination, i.e., when they are in agreement, the frame is determined to be the one being communicated between the LANs, and the frame is transferred to the common unit 210 (step 417) to finish the operation. The received frame is transferred to the common unit 210 by the DMA transfer unit 255, and the DMA transfer is effected from the transmitted frame storage unit 258 in the port 250 to the frame storage unit 215 in the common unit 210.

(i-1) Registration of address SA of the source of transmission

Figure 11:
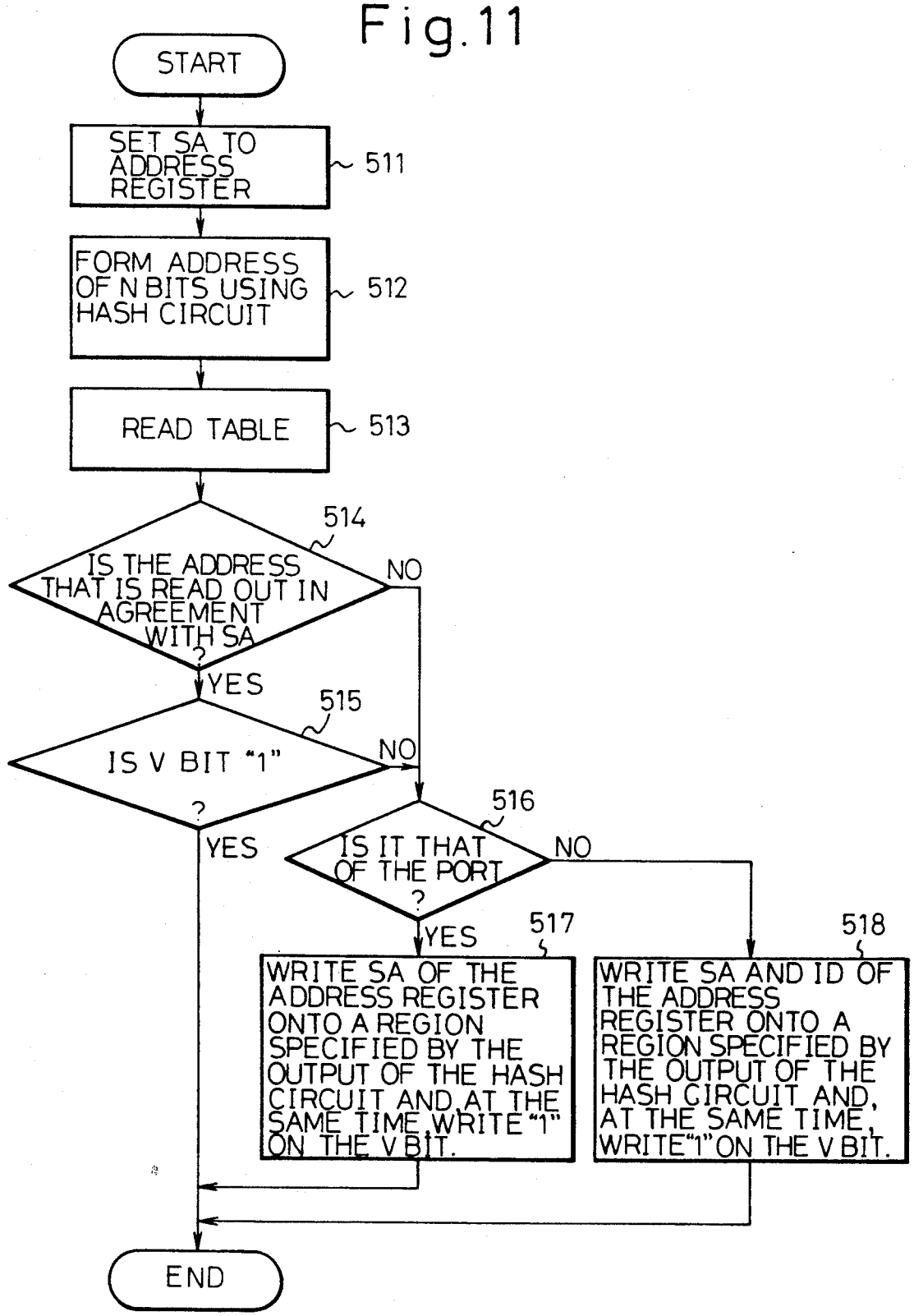
FIG. 11 is a flow chart for explaining the learning operation based on the address of a source of transmission in the address table of FIG. 8.

Described below in detail is the operation for determining the registration and for registering the address when it has not been registered in the above-mentioned steps 413 and 414. FIG. 11 is a flow chart of the operation related to the registration of the address SA of the source of transmission.

First, the microprocessor 251 picks up the address SA of the source of transmission from the received frame, and stores it in the address register 311 in the address table 253 (step 511).

A table address consisting of N bits (e.g., 13 bits) is calculated by the hash circuit 321 (step 512) based on the station address of M bits (e.g., 48 bits) of the address register, in order to read a valid bit V and an address (station address) stored in the above position in the table 341 (step 513).

The hash circuit 321 compresses the number of bits of the address for accessing the table 341, enabling the memory capacity of the table 341 to be decreased, for example from $2^{48}$ addresses to $2^{13}$ addresses.

If the memory capacity of the table is reduced by providing the hash circuit 321, the addresses of the stations that are sources of transmission are not all registered to the table 341 and, as a result, the frames are not completely aborted in the port. However, the purpose of filtering is sufficiently achieved if the common unit 210 is provided with the same frame abortion means as that of the port.

Next, it is determined whether the station address (SA) is stored in the address register 311 or not (step 514), and it is further determined whether the valid bit V is "1" or not, i.e., whether the station address read out from the table 341 is valid or not (step 515).

The comparator circuit 351 compares the station address stored in the address register 311 with the station address read out from the tabled 341, and the AND gate 361 finds a logical product of the result of comparison and the valid bit V read out from the table 341.

Therefore, when affirmative determinations are made in both the steps 514 and 515, the AND gate 361 outputs a signal of the logic "1" which is then informed to the registration control circuit 371. In this case, the microprocessor 251 makes sure that the address SA of the source of transmission read out from the received frame has been registered.

When at least either the step 514 or the step 515 renders the negative determination, the AND gate 361 outputs a signal of the logic level "0". Upon receipt of the output "0" from the AND gate 361, the microprocessor 251 determines whether the address table 253 is that of the port or not (step 516).

Since the address table 253 is that of the port 250, the affirmative determination is rendered and, then, the valid bit V at the above position of the table 341 is changed to "1" and the station address stored in the address register 311 is written (step 517). Thus, the registration of the source address SA is finished.

When the address SA of the source of transmission in the common unit 210 is to be registered, the step 516 renders the negative determination whereby the valid bit V is changed, the station address is written, and the LAN identification number is written (step 518).

As described above, the microprocessor 251 that is informed of the reception of frame carries out a so-called learning process for renewing the address table 253 based on the address SA of the source of transmission included in the received frame.

(i-2) Determination of destination address DA

Figure 12:
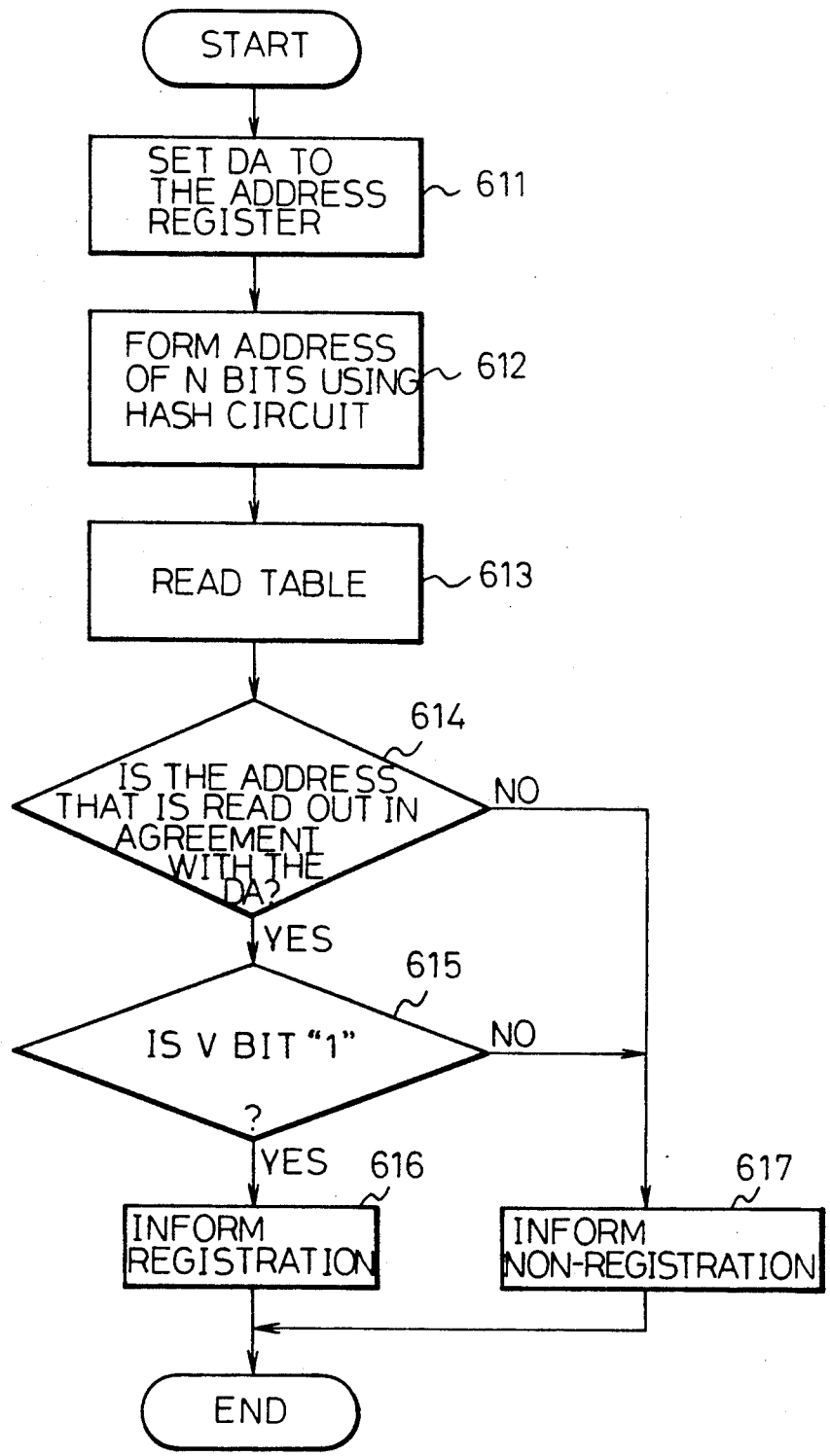
FIG. 12 is a flow chart for explaining the learning operation based on a destination address in the address table of FIG. 8.

Described below in detail is the operation for determining the presence or absence of the registration of the station represented by the destination address DA in the step 415 of FIG. 10. FIG. 12 is a flow chart of the operation for determining the presence or absence of the registration.

First, the microprocessor 251 picks up the destination address DA from the received frame stored in the received frame storage unit 257 and stores it in the address register 311 in the address table 253 (step 611).

Thereafter, a table address is formed by the hash circuit 321 (step 612), the table 341 is read out (step 613), determination is made whether the station address that is read out is in agreement with the station address (DA) that is stored in the address register 311 or not (step 614), and determination is made whether the valid bit V is "1" or not (step 615) in the same manner as the "(i-1) registration of address SA of the source of transmission" described above.

When affirmative determination is made in both the steps 614 and 615, the AND gate 361 outputs a signal of the logic level "1" and registration is informed to the microprocessor 251 (step 616). When at least either the step 614 or the step 615 renders the negative determination, the AND gate 361 outputs a signal of the logic level "0", and non-registration is informed to the microprocessor 251 (step 617).

Thus, the microprocessor 251 retrieves the address table 253 based on the destination address DA of the received frame, and determines the presence or absence or registration of the station address specified by the destination address DA, i.e., determines whether the communication being effected is within the LAN or between LANs.

(ii) Operation of the common unit

Figure 13:
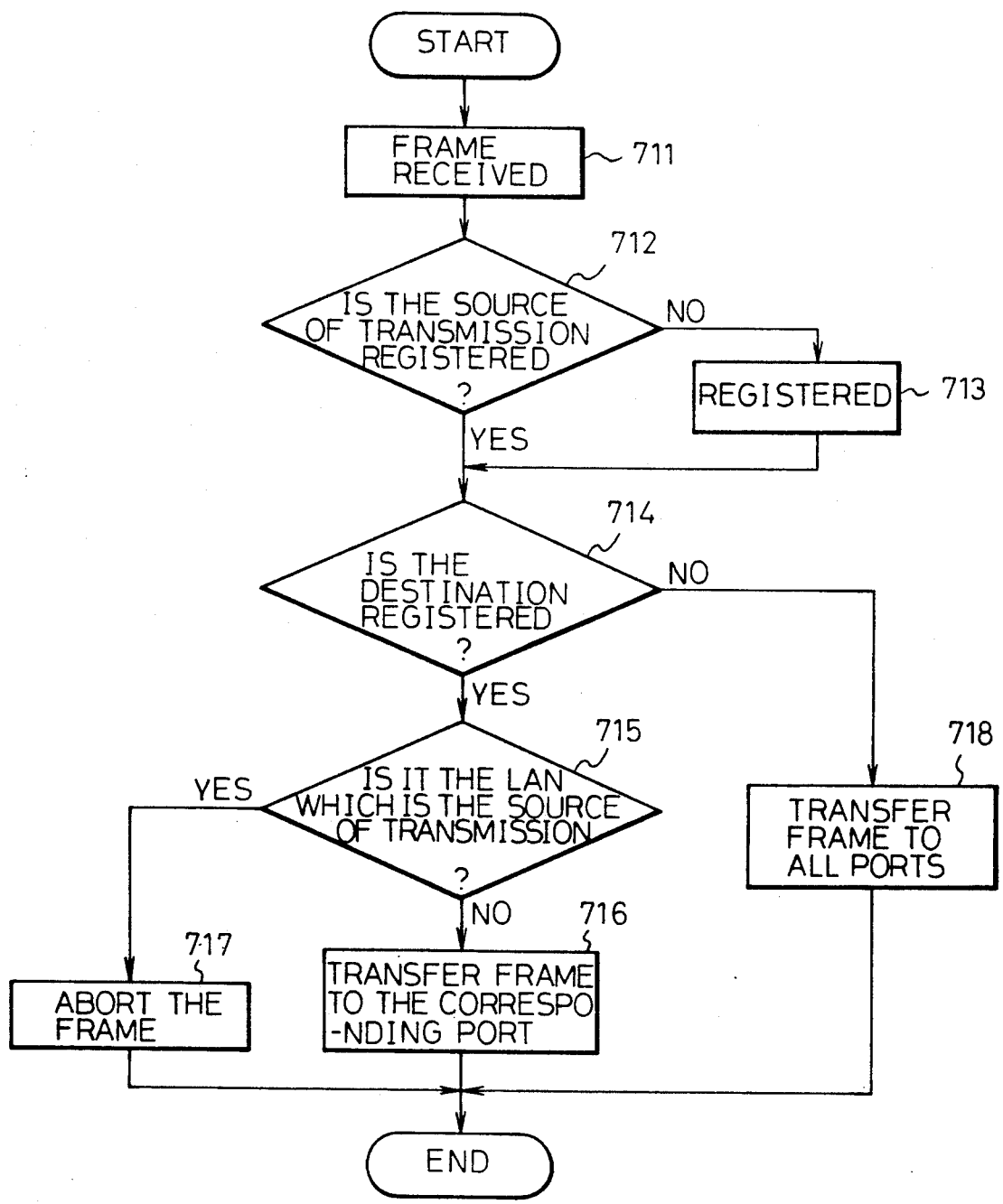
FIG. 13 is a flow chart for explaining the operation of the common unit of FIG. 8.

Next, described below is the operation of the case when the received frame is transferred to the common unit 210. FIG. 13 is a flow chart of the operation of the common unit 210.

When the received frame is transferred from the port 250 (step 711), the microprocessor 211 first determines whether the address SA of the station which is the source of transmission has been registered in the address table 213 or not (step 712). When it has not been registered (negative determination), the address is registered in the address table 213 (step 713).

The address table 213 has the same constitution as the address table 253 in the port 250 except for the provision of the ID register 331 and the registration of the LAN identification number in the table. The determination of registration and the processing of registration in the above-mentioned steps 712 and 713 are carried out according to the flow of operation shown in FIG. 11.

When the step 712 makes an affirmative determination (when the address is registered) or when the registration is finished at the step 713, the microprocessor 211 determines whether the station represented by the destination address DA of the received frame has been registered in the address table 213 or not (step 714). This determination operation is carried out according to the operation flow that is shown in FIG. 12.

In the case of the affirmative determination, i.e., when the station of the destination address DA has been registered, it is then determined whether the destination LAN of the frame is in agreement with the LAN that receives the frame or not (step 715). This determination is carried out by recognizing the destination LAN relying upon the LAN identification number read out from the address table 213.

In the case of communication within the LAN, the received frame has been aborted in the corresponding port, and the microprocessor 211 usually renders that affirmative determination at a step 715 to transfer the frame to a port that corresponds to the LAN indicated by the LAN identification number (step 716). The microprocessor 211 instructs the DMA transfer mechanical unit 255 in the corresponding port to transfer the frame. Being controlled by the DMA transfer mechanical unit 255 that has received the above instruction, the frame is transferred from the frame storage unit 215 in the common unit 210 to the transmitted frame storage unit 258 in the port. In this port, the frame transferred to the transmitted frame storage unit 258 is sent to the LAN by the LAN access circuit 259.

As described above, the step 715 usually makes the affirmative determination but makes the negative determination, for example, when the capacity of address table 253 in each port is smaller than the capacity of address table 213 in the common unit, for instance, when the address space of the table is reduced by using the hash circuit 321 (FIG. 9) as mentioned earlier. In such a case, an affirmative determination is made, and the received frame of communication within the LAN is aborted (step 717) to finish the operation.

When the step 714 (which determines whether the destination address DA has been registered or not) makes the negative determination, then the microprocessor 211 transfers the frame to all ports (step 718) to finish the operation. This would happen when the frame is transmitted to a newly added station or when the destination address DA in the address table 213 is deleted by the learning process. In either case, it is difficult to determine the destination of transmission, and the frame is transmitted to all LANs (or to all LANs except the LAN that transmitted the frame).

IV. Summary of the embodiment of FIGS. 7 and 6

When the frame is received by the port 250 as described above, learning of the address table 253 is first carried out based on the address SA of the source of transmission included in the frame in order to renew the data related to the station that is connected to the corresponding LAN. Then, the LAN which includes the destination station is recognized based on the destination address DA included in the frame, and the frame is transferred to the common unit 210 only when the communication is being carried out between the LANs.

Based on the frame that is transferred, the common unit 210 executes a learning process similar to that of the port 250, and transfers the frame to the port corresponding to the LAN that includes the destination station. The port that has received the frame sends the frame to the corresponding LAN.

Therefore, the frame is transferred to the common unit 210 only when it is determined by each of the ports 250 to 290 that the communication is being carried out between the LANs, thus making it possible to reduce the burden of processing born by the microprocessors 211 and 251 in the ports and common unit and to easily cope with an increase in the speed of communication.

Furthermore, when the LAN that should be held is added, all that is needed is simply to add the port that corresponds to the LAN that is added. Therefore, the network can be easily expanded.

In the aforementioned embodiment shown in FIGS. 7 and 8, the filtering operation is carried out based on firmware using the microprocessor 251 in each port in order to transfer or abort the frame. In order to reduce the burden of the microprocessor and to further increase the processing speed, it is also allowable to carry out the filtering process based on hardware.

V. Another embodiment of the invention

Figure 14:
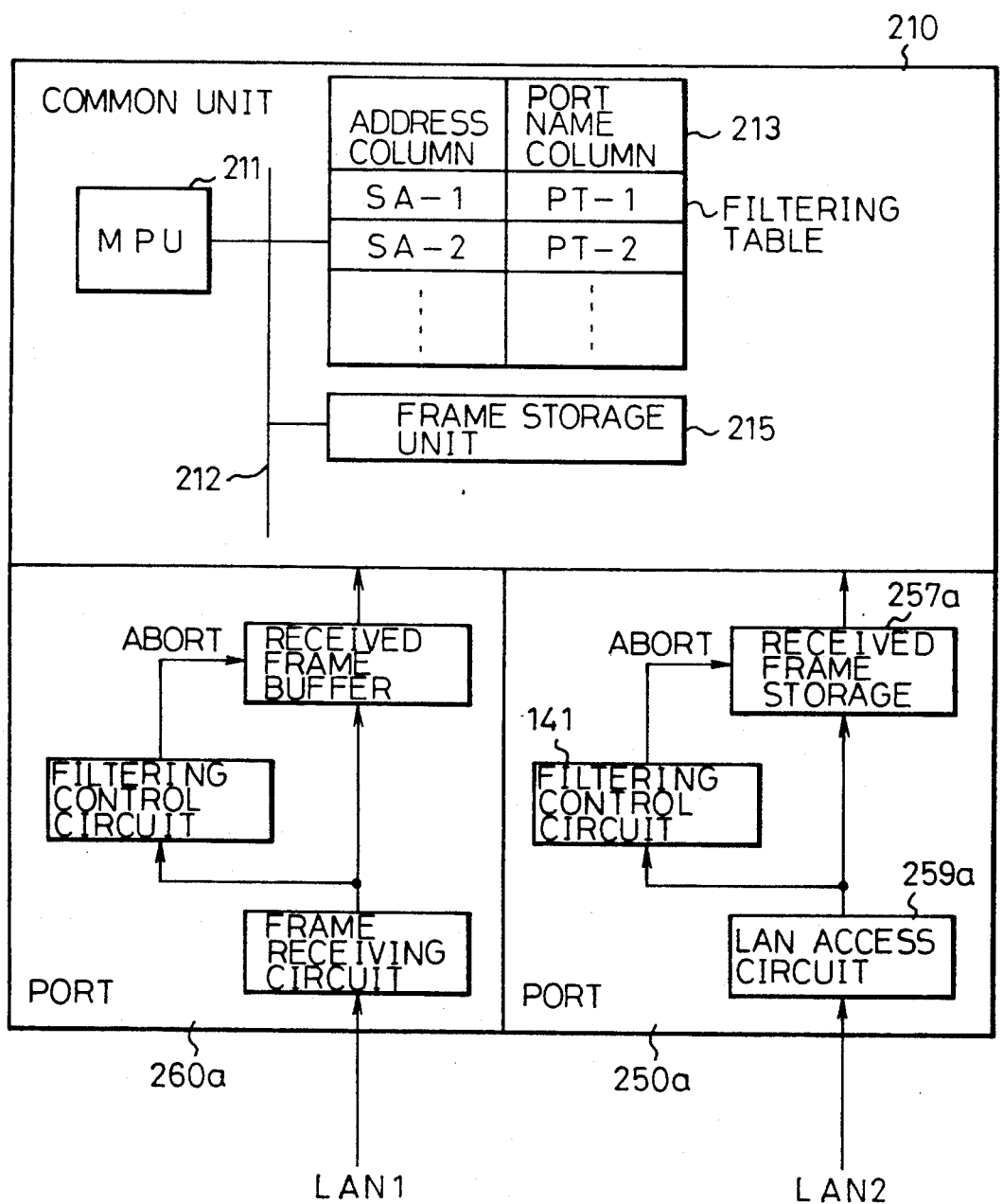
FIG. 14 is a block diagram which schematically shows the constitution of the inter-LAN connection apparatus (MAC bridge) according to another embodiment of the present invention.

FIG. 14 is a block diagram which schematically illustrates the inter-LAN connection apparatus that carries out the filtering process based on the hardware according to another embodiment of the present invention.

In FIG. 14, the same portion as those of FIG. 8 are denoted by the same reference numerals, and similar portions are denoted by the same reference numerals but which have a final "a" added thereto. The inter-LAN connection apparatus according to this embodiment has the common unit 210 and a plurality of ports 250a, 260a, ---. The common unit 210 has an address table 213 that has a plurality of entries with an address column and a port name column, and a frame storage unit 215 that stores the frames sent from the ports and the frames to be sent to the ports. Each port has a LAN access circuit 259a that receives the frames from the LANs and a received frame storage unit 257a that stores the received frames.

The common unit 210 stores the frame that is received in the frame storage unit 215, refers to the address table 213, examines whether the station specified by the destination address of the frame stored in the frame storage unit 257a and the station specified by the address of the source of transmission of the frame is exist on the same LAN or not, and filters the above frame when they exist on the same LAN.

In the aforementioned inter-LAN connection apparatus (MAC bridge) of the embodiment of the present invention, each port is provided with the filtering control circuit 141 which is operated while the writing operation is being effected from the LAN access circuit 259a onto the received frame storage unit 257a. When it is so determined that the frame is to be aborted, the filtering control circuit 141 sends an abort instruction to the received frame storage unit 257a before the frame written into the received frame storage unit 257a to thereby abort the frame.

The filtering control circuit 141 has a plurality of sets of address-holding circuits and comparator circuits, and produces an abort instruction when a destination address of the frame that is received is in agreement with the content of any address-holding circuit.

The addresses of the plurality of sets of address-holding circuits and comparator circuits are specified by a write pointer. When the address of the source of transmission of the frame that is received is not in agreement with the content of any address-holding circuit, the address of the source of transmission is written in the address-holding circuit that is specified by the write pointer, and then the write pointer is increased by +1 after the address is written.

The number of sets of address-holding circuits and comparator circuits provided is $2^n$, and the write pointer is constituted by n bits. When the write pointer is all $1^s$, the renewal starts from the initial value "0".

Figure 15:
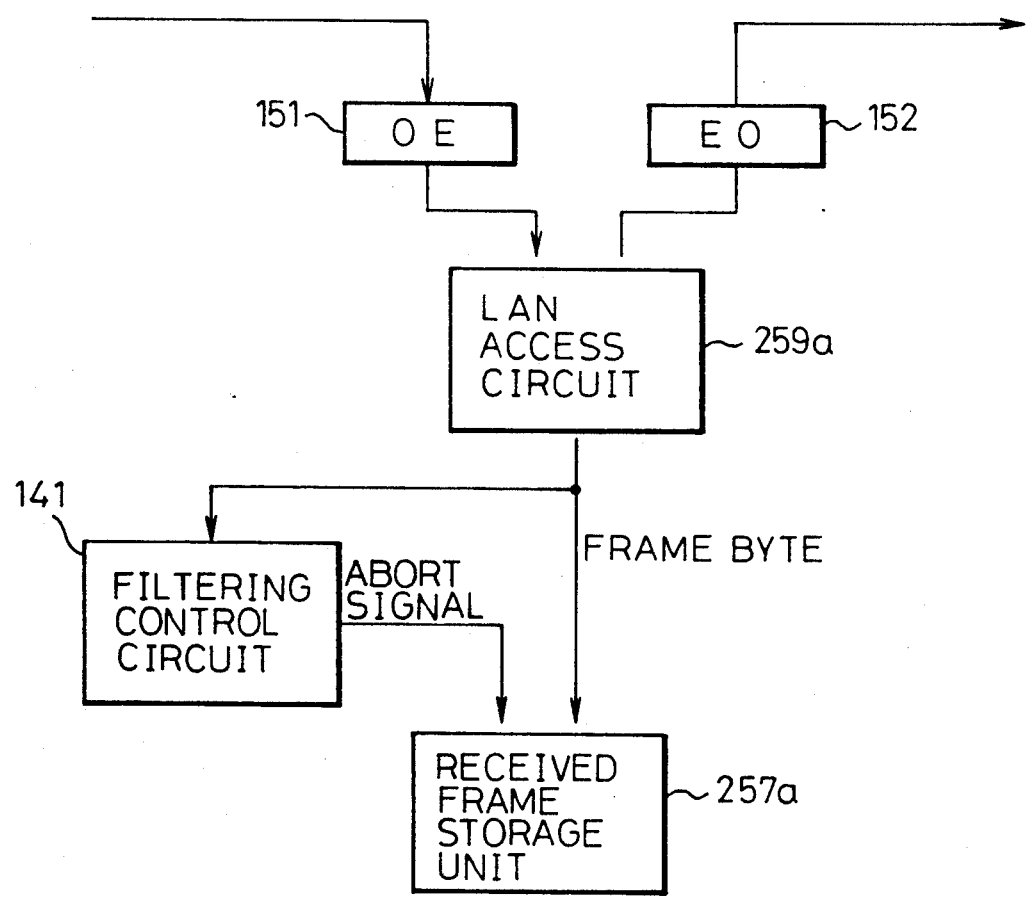
FIG. 15 is a block diagram showing the constitution of the port of FIG. 14.

FIG. 15 is a block diagram showing the constitution of the port 250a of FIG. 14. In FIG. 15, reference numeral 151 denotes a an optoelectronic conversion device, 152 denotes an electroptic conversion device, 259a denotes a LAN access circuit, 141 denotes a filtering control circuit, and 257a denotes a received frame storage unit.

The LAN access circuit 259a receives a frame that is sent from a LAN via optoelectronic conversion device 151, and sends the frame to the LAN via electrooptic conversion device 152. The LAN access circuit 259a sends the received frame to the filtering control circuit 141 and to the received frame storage unit 157a.

The filtering control circuit 141 stores therein the address of the source of transmission, and sends the abort signal to the received frame storage unit 257a when the address of the source of transmission that is stored is in agreement with the destination address of the input frame. This process is carried out before the above frame is written into the received frame storage unit 257a. When the address of the source of transmission that is stored is not in agreement with the address of the source of transmission of the input frame, the filtering control circuit 141 stores the address of the source of transmission of the input frame. The content of the received frame storage unit 257a is sent to the frame storage unit 215 in the common unit 210.

Figure 16:
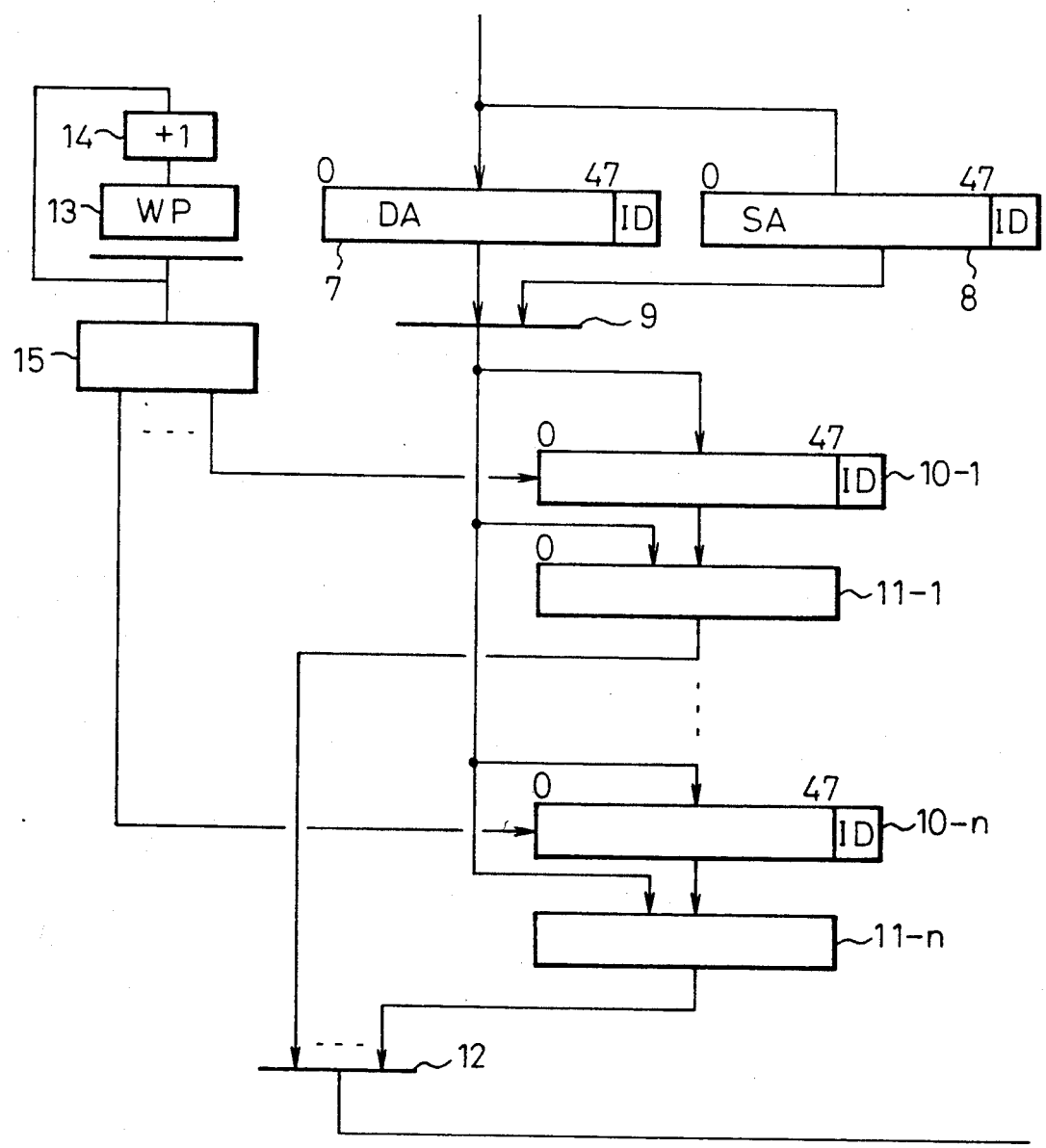
FIG. 16 is a block diagram showing the constitution of a filtering control circuit of FIG. 14.

FIG. 16 is a diagram illustrating the constitution of the filtering control circuit 141 that is shown in FIG. 15, and wherein reference numeral 7 denotes a destination address-holding circuit, 8 denotes a circuit for holding the address of the source of transmission, 9 denotes a selector, reference numerals 10-1 to 10-n denote address-holding circuits, 11-1 to 11-n denote comparator circuits, 12 an OR circuits, 13 a write pointer, 14 a +1 circuit, and reference numeral 15 denotes a decoder.

The destination address of the input frame is sent to the destination address-holding circuit 7. The address of the source of transmission included in the input frame is sent to the circuit 8 that holds the address of the source of transmission. The selector 9 selectively outputs the content of the destination address-holding circuit 7 in the first half cycle and selectively outputs the content of the circuit 8 that holds the address of the source of transmission in the latter half of the cycle. The address-holding circuit 10-i (i=1, ---, n) holds the address of the source of transmission in the frame. The comparator circuit 11-i compares the address of the source of transmission held by the address-holding circuit 10-i with the output of the selector 9. The outputs of the comparator circuits 10-1 to 10-n are input to the OR circuit 12 which outputs a logic 1 when the output of the selector 9 is in agreement with any one of the address-holding circuits 10-1 to 10-n.

When the content of the circuit 8 that holds the address of the source of transmission is in agreement with none of the address-holding circuits 10-1 to 10-n, the address of the source of transmission held in the circuit 8 that holds the address of the source of transmission is written into the address-holding circuit that is specified by the write pointer 13. Thereafter, the content of the write pointer 13 is increased by +1. The content of the write pointer 13 is decoded by the decoder 15, and the address is written onto the address-holding circuit that corresponds to a decode output line having a value 1. When the content is increased by +1 under the condition where the values of the write pointer 13 are all 1, the values of the write pointer 13 becomes all 0 (0-the address-holding circuit 10-1 is specified).

Figure 17:
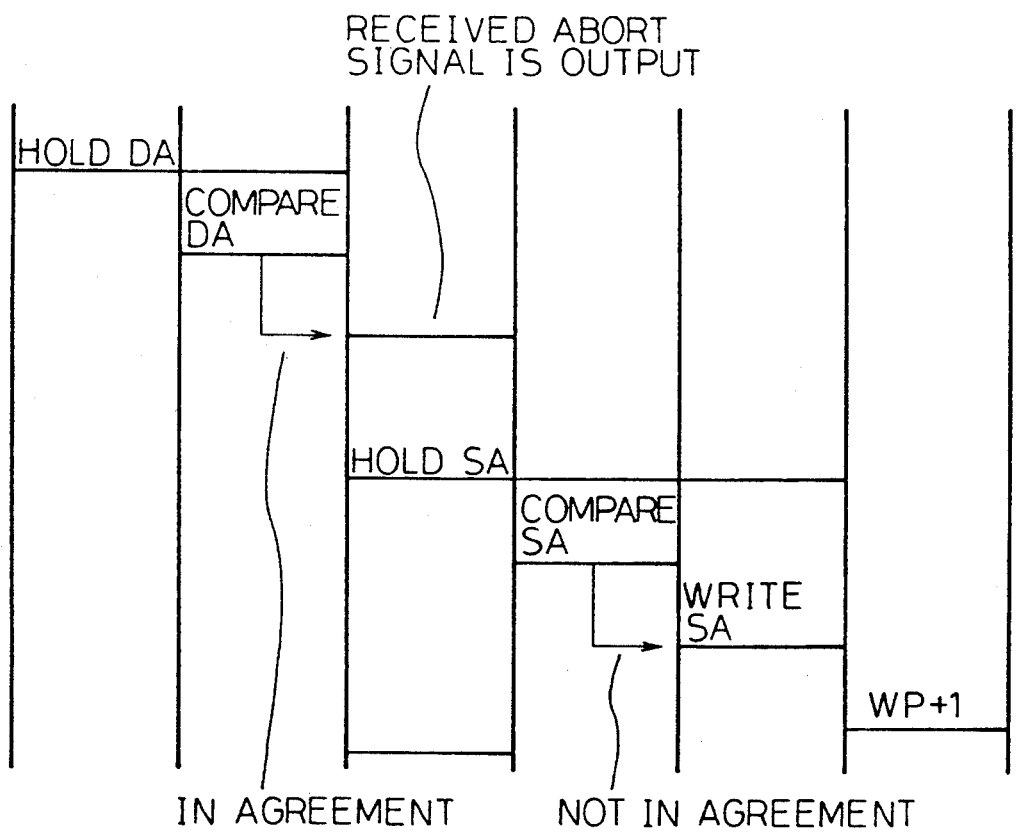
FIG. 17 is a time chart for explaining the operation of the filtering control circuit of FIG. 16.

FIG. 17 is a time chart showing the operation of the filtering control circuit 141 shown in FIG. 16. First, the destination address DA of the input frame is held by the destination address-holding circuit 7, and is compared with the address-holding circuits 10-1 to 10-n. When they are in agreement, a received abort signal is output. Next, the address SA of the source of transmission of the input frame is held by the circuit 8 that holds the address of the source of transmission, and the address of the source of transmission is compared with the address-holding circuits 10-1 to 10-n. When the address is in agreement with none of them, the address SA of the source of transmission is written into the address-holding circuit specified by the write pointer 13. The write pointer 13 is then increased by +1.

VI. Modified embodiment of the invention

The LANs adapted to the aforementioned embodiments of the present invention may be of any type such as bus-type, ring-type, etc.

In the first embodiment, the storage position of the table 341 was specified by the hash circuit 321 at the time of retrieving the address tables 213 and 253 in order to increase that speed of processing. When there is a margin in the speed of processing, the microprocessors 211 and 253 may successively read the data stored in the table 341 to effect the retrieval.

The relationships between the present invention and the embodiments were described in the above section I. Relationships between FIG. 7 and FIG. 8. The invention, however, is in no way limited only thereto but can be easily modified in a variety of other ways by a person skilled in the art.

According to the present invention as described above, the frame being communicated within the LAN is aborted in each of the ports, and the frame is transferred by the common unit when the communication is being established between the LANs, making it possible to offer a filtering rate of a sufficient high speed to satisfy the transfer speed of the LANs. Moreover, since extra frames are not written in the common buffer, the load can be decreased by controlling the buffer and the relay processing ability can be improved.

Furthermore, ports are provided to correspond to each of the LANs, making it easy to cope with the expansion of the network such as by addition or modification of the LANs.

Moreover, since a frame is aborted by the hardware in each port, there is a reduced burden an the microprocessors making it easier to cope with an increase in the speed of communication.

I claim:

1. An inter-LAN connection apparatus having a plurality of ports which operatively connect to a plurality of LANs, respectively, to transmit and receive frames to and from the LANs, and a common unit that is commonly connected to the plurality of ports to transfer the frames among the LANs, each of the plurality of ports comprising:

frame receiving means for receiving a frame supplied from a corresponding LAN;

first transfer means for transferring the received frame to the common unit;

inter-LAN communication determining means for instructing said frame receiving means to abort the frame when a destination of the received frame is the LAN which is a source of transmission and for instructing said first transfer means to transfer the frame when the destination of the received frame a LAN different from the LAN that is the source of transmission; and frame transmitting means for transmitting the frame transferred from said common unit to the corresponding LAN; and said common unit comprises:

frame storage means for storing the frame transferred by said first transfer means;

transfer destination determining means for determining a frame transfer destination based on a destination address which is included in the frame that is stored in said frame storage means; and second transfer means for transferring the frame stored in the frame storage means to a port designated by the frame transfer destination.

2. An inter-LAN connection apparatus according to claim 1, further comprising a plurality of stations to transmit and receive the frames operatively connected to each of the LANs, and wherein the frame includes a destination address, and a station address and wherein said inter-LAN communication determining means comprises:

address table means for storing an address table, means for registering in said address table means a station address of one of the stations which is the source of transmission included in the frame that is received by said frame receiving means, means for comparing the destination address of the received frame with the station address registered in said address table means, and means for instructing said frame receiving means to abort the received frame when the station and destination addresses match based on the comparison and for transferring the received frame to said common unit via said first transfer means when the station and destination address do not match based on the comparison.

3. An inter-LAN connection apparatus according to claim 2, wherein said inter-LAN communication determining means comprises:

means for determining whether the station address of one of the stations which is the source of transmission included in the received frame has been registered in said address table means and means for registering the station address in said address table means when the determination by said means indicates that the station address has not been registered.

4. An inter-LAN connection apparatus according to claim 1, further comprising a plurality of stations operatively connected to a corresponding one of the LANs, and wherein said inter-LAN communication determining means comprises:

address table means for storing an address table and a microprocessor, operatively connected to said address means, to said frame receiving means, and to said first transfer means, comprising:

means for registering in said address table means an address of one of said stations which is the source of transmission included in the frame that is received by said frame receiving means, means for comparing a destination station address that is registered in said address table, and means for instructing said frame receiving means to abort the received frame when the station and destination addresses match based on the comparison and for transferring the received frame to said common unit via said first transfer means when the addresses do not match based on the comparison.

5. An inter-LAN connected apparatus according to claim 4, wherein said microprocessor further comprises means for determining whether the station address which is the source of transmission included in the received frame has been registered in said address table means; and means for registering the station address that is the source of transmission included in the received frame in said address table when the determination indicates that the station address had not been registered.

6. An inter-LAN connection apparatus according to claim 2, further comprising:

a hash circuit, connected to said address table means, said registering means and said comparing means for generating addresses of an address space smaller than one of an address space determined by a number of bits of the station address which is the source of transmission and of the destination address based upon the station address which is the source of transmission and the destination station address, and for accessing said address table means.

7. An inter-LAN connection apparatus according to claim 2, further comprising a plurality of stations operatively connected to a corresponding one of the LANs, and wherein the transfer destination determining means in the common unit comprises:

address table means for storing an address table, means for registering in said address table means, a station address of one of said stations which is the source of transmission included in the received frame that is stored in said frame storage means, means for comparing the destination address of the received frame with the station address registered in said address table, and means for transferring the received frame in the corresponding port when the station and destination addresses match based on the comparison and for transferring the received frame to all of the ports when the station and destination addresses do not match based on the comparison.

8. An inter-LAN connection apparatus according to claim 6, wherein said transfer destination determining means comprises:

another address table means for storing another address table, means for registering in said another address table an address of a station which is the source of transmission included in the received frame that is stored in said frame storage means and an identification number of the LAN to which the station that is the source of transmission pertains, means for comparing the destination station address of the received frame with the station address registered in said another address table means, means for determining, when the station and destination addresses are in agreement with each other based on the comparison, whether an identification number of a destination LAN is the same as the identification number of the LAN which is the source of transmission, means for aborting the received frame when the identification numbers are the same based on the determination, and means for transferring the received frame to all of said ports when the station and destination addresses do not match with each other based on the comparison.

9. An inter-LAN connection apparatus according to claim 1, wherein said frame receiving means comprises:

a LAN access circuit connected to the corresponding LAN and a received frame storage unit connected to said LAN access circuit;

said inter-LAN communication determining means includes a filtering control circuit connected between said LAN access circuit and said received frame storage unit;

said filtering control circuit includes means for executing while the frame is being written into said received frame storage unit from said LAN access circuit, for determining whether the frame should be filtered and for sending an abort instruction to said received frame storage unit before the completion of writing of the frame into said received frame storage unit so that the frame is aborted.

10. An inter-LAN connection apparatus according to claim 9, wherein said filtering control circuit further comprises:

comparator circuits;

a plurality of sets of circuits for holding the address of the source of transmission and addresses of said comparator circuits; and means for sending abort instruction to said received frame storage unit when the destination address of the frame agrees which the content of any one of said circuits for holding the address of the source of transmission when the frame is received.

11. An inter-LAN connection apparatus according to claim 10, wherein said filtering control circuit further comprises a write pointer which specifies the addresses of the sets of said circuits for holding the addresses of the sources of transmission and said comparator circuits, and means for writing the address of the source of transmission into one of said circuits that holds the address of the source of transmission specified by said write pointer when the address of the source of transmission of the frame is not in agreement with the content of any of said circuits, for holding the address of the source of transmission when the frame is received and for increasing the write pointer after the address is written.

12. An inter-LAN connection apparatus according to claim 11, wherein a number of sets of said circuits provided for holding the addresses of the sources of transmission and said comparator circuits is $2^n$, said write pointer is comprised by n bits.

13. An inter-LAN connection method in an inter-LAN connection apparatus having a plurality of ports which correspond to a plurality of LANs, respectively, to transmit and receive frames to and from the LANs, and a common unit that is commonly connected to the plurality of ports to transfer the frames among the LANs, the method includes the steps of:

(a) aborting a frame received from a corresponding LAN when a destination designated by the received frame exists in the LAN that is the source of transmission, (b) transferring the received frame to the common unit when the destination is a LAN different from the LAN that is the source of transmission, (c) determining the transfer destination of the frame based on a destination address which is included in the frame transferred from said corresponding port, (d) transferring the frame to the port of transfer destination that is determined, and (e) sending the frame transferred from the common unit to the corresponding LAN.

14. An inter-LAN connection method according to claim 13, wherein a plurality of stations are connected to each of said LANs to transmit and receive the frames and an address of one of the stations which is the source of transmission included in the received frame is registered in an address table in each of the ports; and wherein the method further comprises the steps of:

(f) comparing the destination station address of the transmitted frame with the station address that is registered in the address table;

(g) aborting the received frame when the station and destination addresses are in agreement as a result of step (f); and (h) transferring the received frame to the common unit when the station and destination addresses are not in agreement as a result of step (f).

15. An inter-LAN connection method according to claim 14, further comprising the steps of:

determining whether the address of the station which is the source of transmission included in the received frame has been registered in the address table and registering the address of the station which is the source of transmission included in the received frame in the address table when the address has not been registered as a result of the determination.

16. An inter-LAN connection method according to claim 13, further comprising the steps of:

(f) registering the address of the station which is the source of transmission included in the received frame in said address table;

(g) comparing the destination station address included in the received frame with the station address registered in said address table;

(h) aborting the received frame when step (g) indicates that the station destination addresses are in agreement; and (i) transferring the received frame in said common unit when said compared result indicates that the addresses are not in agreement.

17. An inter-LAN connection method according to claim 16, further comprising the steps of:

(j) determining whether the address of the station which is the receiving site included in the received frame has been registered in said address table; and (k) registering the address of the station which is the source of transmission included in the received frame in said address table when the address has not been registered according to the determination in step (j).

18. An inter-LAN connection method according to claim 14, further comprising the steps of:
(i) generating addresses of an address space smaller than the address space determined by the number of bits of the address of the station which is the source of transmission and of said destination station address,
(j) relying upon the address of the station which is the source of transmission or the destination station address; and
(k) accessing said address table using the addresses of the smaller address space.

19. An inter-LAN connection method according to claim 13, comprising the steps of:
(f) registering the address of the station which is the source of transmission included in the received frame in the address table;
(g) comparing the address of the destination station of the received frame with the station address registered in the address table; and
transferring the received frame to a corresponding port when the addresses are in agreement according to the comparison of step (g) and for transferring the received frame to all of the ports when the addresses are not in agreement according to the comparison of step (g).

20. An inter-LAN connection method according to claim 17, further comprising the steps of:
(l) registering in the address table the address of the station which is the source of transmission included in the received frame and an identification number of a corresponding LAN to which said station that is the source of transmission pertains;
(m) comparing the address of the destination station of the received frame with the station address that is registered in the address table;
(n) determining whether the identification number of a destination LAN is the same as the identification number of the LAN which is the source of transmission when said addresses are in agreement according to the comparison in step (m);
(o) aborting the received frame when the identification numbers are the same according to the determination in step (n);
(p) transferring the received frame to a corresponding port when the identification numbers are not the same according to the determination in step (n); and
(q) transferring the received frame to all of the ports when the station and destination addresses are not in agreement according to the comparison of step (m).

* * * * *

UNITED STATES PATENT AND TRADEMARK OFFICE
CERTIFICATE OF CORRECTION

PATENT NO. : 5,151,897

DATED : September 29, 1992

INVENTOR(S) : Hideo Suzuki

It is certified that error appears in the above-identified patent and that said Letters Patent is hereby corrected as shown below:

On title page, after [56] References Cited, second column, line 2, "Doouglas" should be --Douglas--.

In the Drawings:

Fig. 7, numeral 725, "transfar" should be

--transfer--

Fig. 8. numeral 255, "transfar" should be

--transfer--

Figure 10:
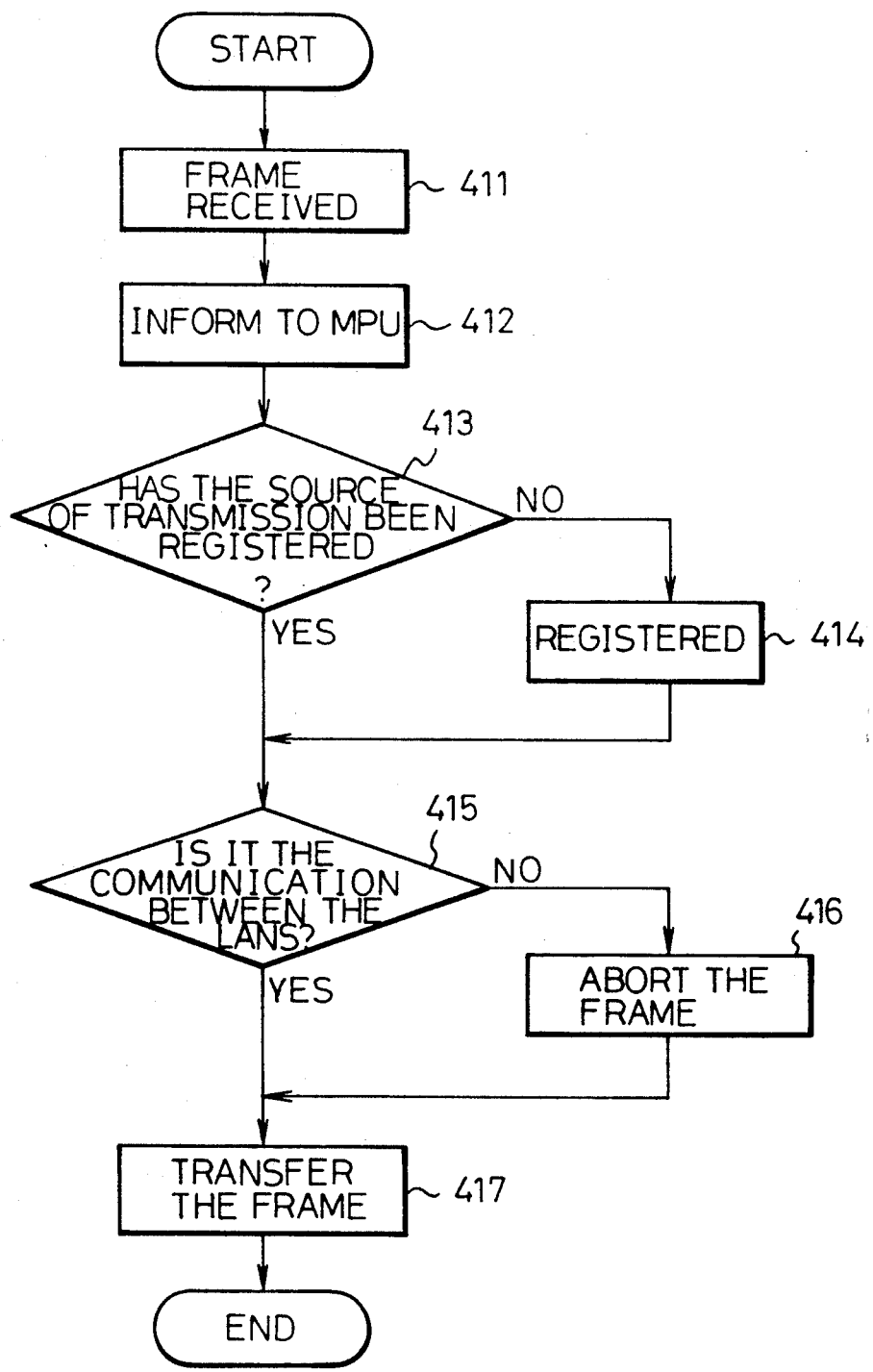
FIG. 10 is a flow chart for explaining the operation of a port of FIG. 8.

Fig. 10, numeral 412, delete "to"

Col. 1, line 39, "what" (first occurrence) should be

--to--; and line 47, delete "to".

UNITED STATES PATENT AND TRADEMARK OFFICE
CERTIFICATE OF CORRECTION

PATENT NO. : 5,151,897
DATED : September 29, 1992
INVENTOR(S) : Hideo Suzuki

It is certified that error appears in the above-indentified patent and that said Letters Patent is hereby corrected as shown below:

Col. 17, line 47, "address" should be --addresses--.

Signed and Sealed this

Sixth Day of December, 1994

Attest:

BRUCE LEHMAN

Attesting Officer

Commissioner of Patents and Trademarks